(12) United States Patent  
Kort

(10) Patent No.: US 8,593,703 B2  
(45) Date of Patent: Nov. 26, 2013

(54) IMAGING HEAD FOR A FLAT BED SCANNER

(75) Inventor: Moshe-Baruch Kort, Netanya (IL)

(73) Assignee: Eastman Kodak Company, Rochester, NY (US)

( * ) Notice: Subject to any disclaimer, the term of this patent is extended or adjusted under 35 U.S.C. 154(b) by 155 days.

(21) Appl. No.: 13/229,980

(22) Filed: Sep. 12, 2011

(65) Prior Publication Data

US 2013/0063791 A1    Mar. 14, 2013

(51) Int. Cl.
| | |
|---|---|
| H04N 1/04 | (2006.01) |
| H04N 1/21 | (2006.01) |
| G06F 3/12 | (2006.01) |
| A61B 6/00 | (2006.01) |
| G01B 11/00 | (2006.01) |
| G01J 1/42 | (2006.01) |

(52) U.S. Cl.
USPC .......... 358/474; 358/1.13; 358/461; 358/296; 358/481; 358/494; 600/476; 356/390; 250/208.2

(58) Field of Classification Search
USPC ............... 358/474, 1.13, 461, 296, 481, 494; 600/476; 356/390; 250/208.2
See application file for complete search history.

(56) References Cited

U.S. PATENT DOCUMENTS

| 4,586,089 A * | 4/1986 | Nakazato et al. ............. 358/461 |
| 5,331,147 A * | 7/1994 | Mizuno et al. ............. 250/208.2 |
| 2003/0081211 A1* | 5/2003 | Nishio et al. .................. 356/390 |
| 2005/0234346 A1* | 10/2005 | Sunagawa et al. ............ 600/476 |
| 2013/0063744 A1* | 3/2013 | Kort ............................. 358/1.13 |

FOREIGN PATENT DOCUMENTS

EP    1 291 699 A1    9/2002

* cited by examiner

*Primary Examiner* — Charlotte M Baker  
*Assistant Examiner* — Rury Grisham  
(74) *Attorney, Agent, or Firm* — Nelson Adrian Blish

(57) ABSTRACT

A method for imaging using a flatbed imaging system includes providing first imaging data to a first imaging source; providing second imaging data to a second imaging source; imaging a first beam from the first imaging source at a first height on a rotating multi-facet spinner; imaging a second beam from the second imaging source at a second height on the rotating multi-facet spinner; distributing the first beam on a first location on a printing plate; and distributing the second beam on a second location on a the printing plate.

10 Claims, 5 Drawing Sheets

IMAGING HEAD FOR A FLAT BED SCANNER

CROSS REFERENCE TO RELATED APPLICATIONS

Reference is made to commonly-assigned U.S. patent application Ser. No. 13/229,944 (now U.S. Publication No. 2013/0063744), filed Sep. 12, 2011, entitled IMAGING HEAD FOR A FLAT BED SCANNER, by Kort; the disclosure of which is incorporated herein.

FIELD OF THE INVENTION

The present invention relates to methods and apparatus for printing plates imaging head and more specifically to a flat bed imaging head.

BACKGROUND OF THE INVENTION

Digital imaging systems have gained wide acceptance in the preparation of printing precursor elements for use in printing operations. For example, flexographic printing presses are widely used in the printing of packaging products where the use of a compressible relief imaging element is advantageous for printing on a variety of substrates including, for example, plastic and cardboard. A flexographic media generally comprises a layer of photopolymer that is exposed to UV radiation through an image mask, such as a film, to selectively harden the photopolymer.

Optical heads for imaging emit a plurality of light spots on a light-sensitive medium. The optical imaging head may be configured from an array of pigtailed laser diodes. Each laser diode is optically coupled to a proximal tip of a multi-mode optical fiber. The media is often on a rotational drum and imaged by the array of lasers. Another system for imaging printing plates is a flat bed based imaging device. The media is positioned on a horizontal bed and the optical path is designed to scan the optical beam across the media mounted on the flat bed.

The present invention addresses different features used in computer to plate (CTP) devices, and more specifically in the field of direct imaging on a media positioned on a flat bed.

SUMMARY OF THE INVENTION

Briefly, according to one aspect of the present invention a method for imaging using a flatbed imaging system includes providing first imaging data to a first imaging source; providing second imaging data to a second imaging source; imaging a first beam from the first imaging source at a first height on a rotating multi-facet spinner; imaging a second beam from the second imaging source at a second height on the rotating multi-facet spinner; distributing the first beam on a first location on a printing plate; and distributing the second beam on a second location on a the printing plate.

The imaging device scans plurality of imaging data on a plurality of media regions during the same imaging cycle.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It will be understood that elements not specifically shown or described may take various forms well known to those skilled in the art.

Figure 1:
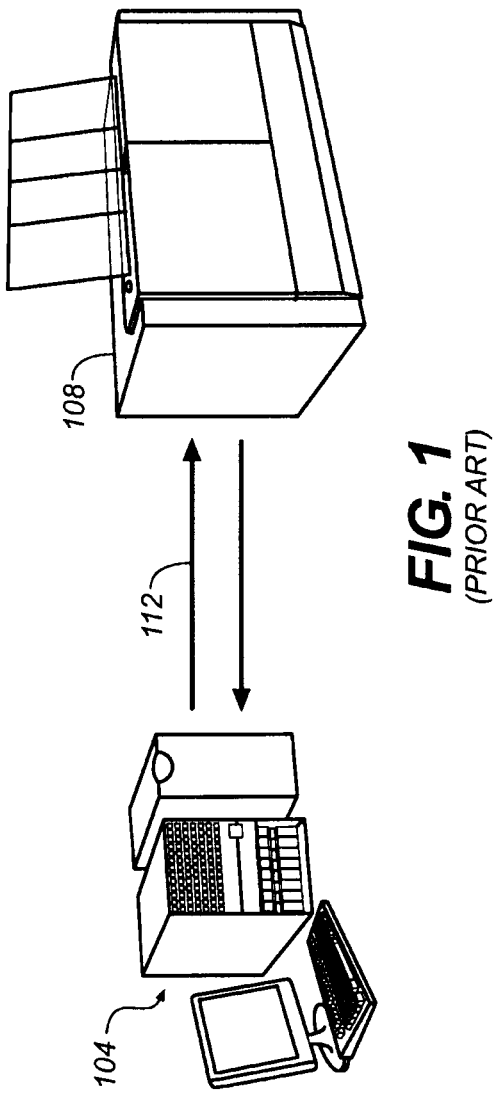
FIG. 1 shows, in diagrammatic form, a prior art digital front end driving an imaging device.

FIG. 1 shows a plate imaging device 108. The imaging device is driven by a digital front end (DFE) 104. The DFE receives printing jobs in a digital form from desktop publishing (DTP) systems (not shown) and renders the digital information for imaging. The rendered information and imaging device control data are communicated between DFE 104 and imaging device 108 over interface line 112.

Figure 2:
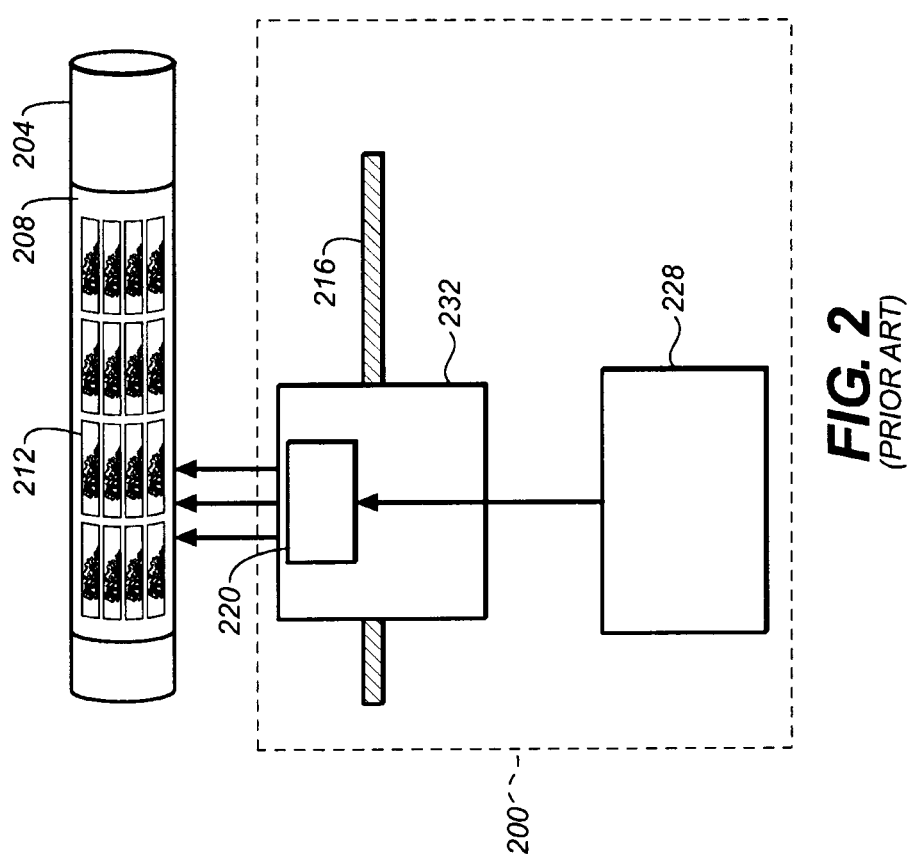
FIG. 2 shows, in diagrammatic form, a prior art imaging head for a drum based imaging device.

FIG. 2 shows an imaging system 200. The imaging system 200 includes an imaging carriage 232 on which an imaging head 220 is mounted. The imaging head 220 is controlled by controller 228. The imaging head 220 is configured to image on a printing plate 208 mounted on a rotating cylinder 204. The carriage 232 moves substantially parallel to cylinder 204 guided by an advancement screw 216. The printing plate 208 is imaged by imaging head 220 to form imaged data 212 on plate 208. FIG. 2 shows an example of an imaging head 220 imaging on printing plate 208 which is mounted on an imaging drum or cylinder 204. Flat bed imaging devices (not shown) are available in the market as well. A flat bed imaging head is described herein.

Figure 3:
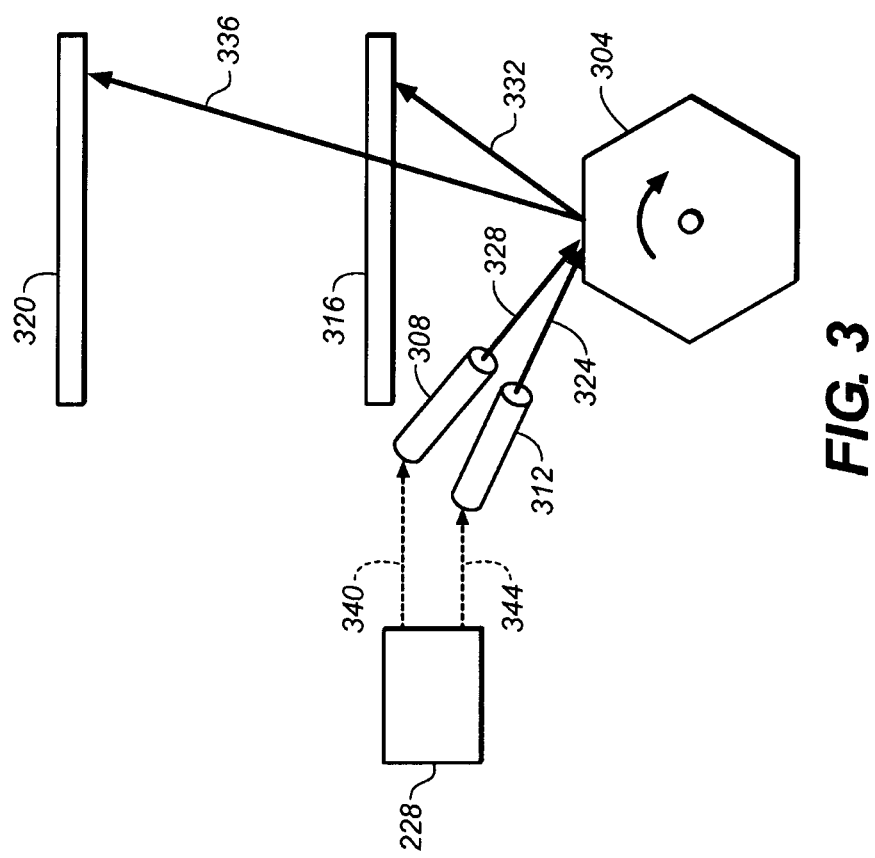
FIG. 3 shows, in diagrammatic form, a multi-channel spinner or polygon receiving imaging data from multiple laser sources and delivering it to multiple regions on the media.

FIG. 3 shows a schematic illustration of a rotating polygon or multi-spinner 304 designed to distribute laser beams 324 and 328 to long mirrors 316 and 320 respectively. The laser beams 324 and 328 are fed by laser sources 308 and 312 with image data 340 and 344 respectively, provided by controller 228. The arrangement can include more than two sets of laser sources and two sets of long mirrors.

Figure 4:
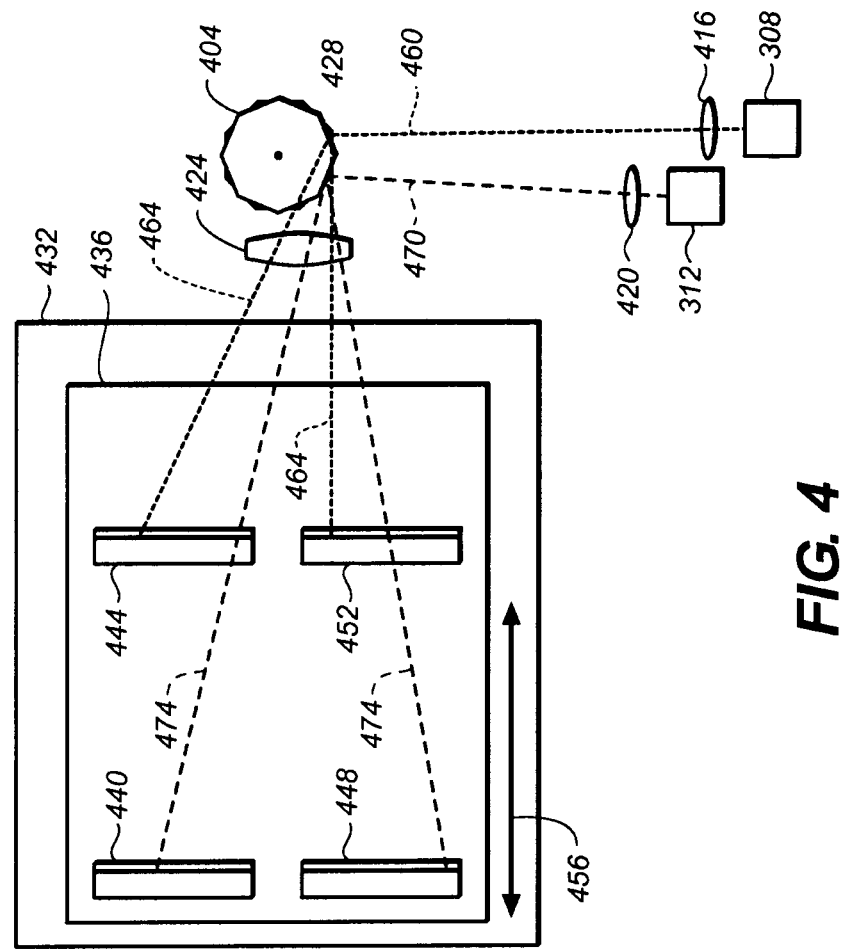
FIG. 4 shows a plan view of a flat bed scanner using a multi-channel spinner arrangement.

The multi-spinner is a polygon shape wherein each facet represents a full fast scan line impinging on a long mirror. The laser beams 324 and 328 are directed at different heights on the multi-spinner 304 and are deflected from multi-spinner 304 to the long mirrors 316 and 320 by beams 332 and 336 respectively. The long mirrors 316 and 320 are positioned at an angle to direct the laser beams onto a printing plate 436 or out multiple printing plates (not shown). A plan view of an embodiment using four mirrors is shown in FIG. 4. The multi-spinner 304 line distributes laser light in this embodiment.

FIG. 4 shows a flat bed imaging arrangement 400. The multi-spinner 404 can be arranged with few independently rotating spinners arranged one of top of each other or alternatively in a tall single piece structure, shown in FIG. 5. The independent spinners may vary in diameter from each other.

As discussed above, the light beam is emitted from multiple laser sources 308 and 312 through lenses 416 and 420 respectively on the multi-facet structure 428 of multi-spinner 404. Laser source 308 emits beam 460 on multi-spinner 404, further distributed from spinner as beam 464 which is directed on mirrors 444 and 452. Laser source 312 emits beam 470 on multi-spinner 404, further distributed from spinner as beam 474 which is directed on mirrors 440 and 448. The light from the different laser sources is emitted at different heights on multi-spinner 404 or at different independent spinners. The light is further distributed through lens 424 on to multiple long mirrors 440, 444, 448 and 452. The emitted light beams are directed towards printing plate 436. The printing plate 436 is affixed to a vacuum table 432. The vacuum table 432 is adapted to advance between in the slow scan direction at carriage direction 456.

Figure 5:
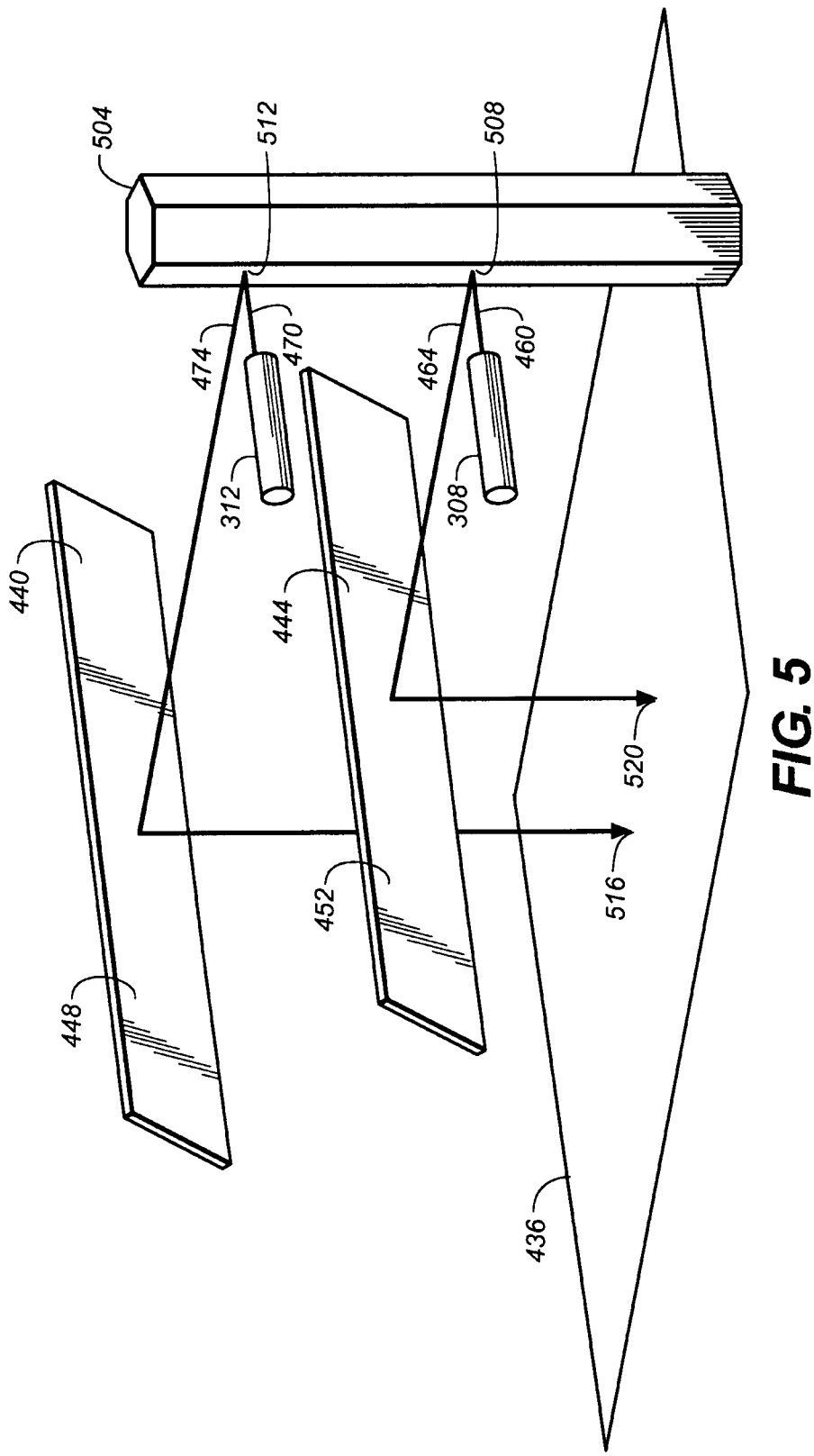
FIG. 5 shows a perspective view of a flat bed imaging head using a multi-channel spinner arrangement.

FIG. 5 shows a perspective view of a flat bed imaging head using an exemplary multi-channel spinner arrangement. Beam 460 emitted from laser source 308 hits spinner 504 at a first height 508. The incoming beam 460 is distributed by spinner 504 as beam 464 onto mirrors 444 and 452 (or onto a single long mirror) and is further deflected on printing plate 436 at first region 516. In parallel, at least one other laser source 312 emits beam 470 which hits spinner 504 at a second height 512. The incoming beam 470 is further distributed by spinner 504 as beam 464 onto mirrors 440 and 448 (or onto a single long mirror) and is further deflected on printing plate 436 at first region 520.

The invention has been described in detail with particular reference to certain preferred embodiments thereof, but it will be understood that variations and modifications can be effected within the scope of the invention.

PARTS LIST 104 digital front end (DFE)
108 imaging device
112 interface line
200 imaging system
204 rotating cylinder
208 printing plate
212 imaged data
216 screw
220 imaging head
228 controller
232 carriage
304 multi-spinner
308 first laser source imaging at a first height
312 second laser source imaging at a second height
316 first long mirror positioned at 45 degrees at a first height
320 second long mirror positioned at 45 degrees at a second height
324 laser beam from first laser source hitting spinner at a first height
328 laser beam from second laser source hitting spinner at a second height
332 laser beam deflected from spinner first height to first long mirror
336 laser beam deflected from spinner second height to second long mirror
340 image data for first laser source
344 image data for second laser source
400 flat bed imaging arrangement
404 multi channel spinner
416 lens
420 lens
424 lens in front of multi channel spinner
428 multi-facet structure
432 vacuum table
436 printing plate
440 first long mirror positioned at 45 degrees at a first height
444 second long mirror positioned at 45 degrees at a first height
448 third long mirror positioned at 45 degrees at a second height
452 fourth long mirror positioned at 45 degrees at a second height
456 carriage direction
460 beam from laser source 308
464 beam 460 distributed from multi channel spinner
470 beam from laser source 312
474 beam 470 distributed from multi channel spinner
504 spinner
508 first height spot
512 second height spot
516 first region on printing plate 436
520 second region on printing plate 436

The invention claimed is:

1. A method for imaging using a flatbed imaging system comprising:
providing first imaging data to a first imaging source;
providing second imaging data to a second imaging source;
imaging a first beam from the first imaging source at a first height on a rotating multi-facet spinner;
imaging a second beam from the second imaging source at a second height on the rotating multi-facet spinner;
distributing the first beam on a first location on a printing plate; and
distributing the second beam on a second location on a the printing plate.

2. The method according to claim 1 wherein the multi-facet spinner comprises at least two multi facet spinner elements adapted to rotate independently to each other.

3. The method according to claim 2 wherein each of the at least two multi-facet spinner elements are a different size.

4. The method according to claim 1 wherein the imaging media comprises a single media element.

5. The method s according to claim 1 wherein the imaging media comprises from at least two media elements.

6. The method according to claim 5 wherein a different color separation is imaged on each of the at least two media elements.

7. The method according to claim 5 wherein a different print job is imaged on each of the at least two media elements.

8. The method according to claim 1 wherein each facet of the multi-facet spinner images a subsequent line on the imaging media.

9. The method according to claim 1 comprising:
imaging the first beam from the multi-facet spinner on a first mirror prior to imaging the media; and
imaging the second beam from the multi-facet spinner on a second mirror prior to imaging the media.

10. A method for imaging using a flatbed imaging system comprising:
providing first imaging data to a first imaging source;
providing second imaging data to a second imaging source;
imaging a first beam from the first imaging source at a first height on a first multi-facet spinner;
imaging a second beam from the second imaging source at a second height on the first multi-facet spinner;
distributing the first beam on a first location on a printing plate; and
distributing the second beam on a second location on a the printing plate.

* * * * *